(12) United States Patent
Baumeister et al.

(10) Patent No.: US 8,519,768 B2
(45) Date of Patent: Aug. 27, 2013

(54) CLOCK GLITCH DETECTION

(75) Inventors: Markus Baumeister, Munich (DE);
Joachim Kruecken, Munich (DE); Rolf Schlagenhaft, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 57 days.

(21) Appl. No.: 13/148,487

(22) PCT Filed: Mar. 31, 2009

(86) PCT No.: PCT/IB2009/051344
§ 371 (c)(1),
(2), (4) Date: Aug. 9, 2011

(87) PCT Pub. No.: WO2010/112969
PCT Pub. Date: Oct. 7, 2010

(65) Prior Publication Data
US 2011/0311017 A1 Dec. 22, 2011

(51) Int. Cl.
*H03K 3/00* (2006.01)
(52) U.S. Cl.
USPC .......................... 327/295; 327/291; 327/299
(58) Field of Classification Search
USPC .............................. 327/291, 299, 295; 377/39
See application file for complete search history.

(56) References Cited

U.S. PATENT DOCUMENTS

| 4,389,622 A | 6/1983 | Kackman |
| 4,864,158 A | 9/1989 | Koelle et al. |
| 5,381,126 A * | 1/1995 | McClure .................... 340/146.2 |
| 5,526,286 A | 6/1996 | Sauerwein et al. |
| 5,721,944 A | 2/1998 | Gallet et al. |
| 5,764,524 A | 6/1998 | Andersson et al. |

(Continued)

FOREIGN PATENT DOCUMENTS

| GB | 1452559 | 10/1976 |
| JP | 2006-005576 | 1/2006 |

(Continued)

OTHER PUBLICATIONS

Chan, Y.C. et al., "The Autonomous Detection of Clock Problems in Satellite Timekeeping Systems," 31st Annual Precise Time and Time Interval (PTTI) Meeting, Dec. 7-9, 1999; pp. 111-120; printed from <<http://tycho.usno.navy.mil/ptti/ptti99/PTTI_1999_111.PDF>> on Nov. 12, 2012.

(Continued)

*Primary Examiner* — John Poos

(57) ABSTRACT

A circuit comprises a clock tree for distributing a clock signal. A first counter is arranged at a first point in the clock tree. Upon detecting a triggering edge in the clock signal, the first counter sets a first current count equal to a first delayed count. After a first delay, the first counter sets the first delayed count equal to the first current count plus an increment. A second counter is arranged at a second point in the clock tree. Upon detecting a triggering edge in the clock signal, the second counter sets a second current count equal to a second delayed count. After a second delay, the second counter sets the second delayed count equal to the second current count plus the increment. A comparator compares the first current count and the second current count. The first point and the second point are not the same, or the second delay is longer than the first delay.

20 Claims, 7 Drawing Sheets

(56) References Cited

U.S. PATENT DOCUMENTS

| | | |
|---|---|---|
| 5,812,250 A | 9/1998 | Ishida et al. |
| 5,923,191 A | 7/1999 | Nemetz et al. |
| 6,285,396 B1 | 9/2001 | Shoshanim et al. |
| 6,535,024 B1 | 3/2003 | Rochard |
| 6,543,027 B1 | 4/2003 | Hughes et al. |
| 6,728,649 B2 | 4/2004 | McMahan et al. |
| 7,129,757 B2 | 10/2006 | Geer et al. |
| 7,352,214 B2 | 4/2008 | Evans et al. |
| 7,372,304 B2 | 5/2008 | Fruhauf et al. |
| 7,592,843 B1 | 9/2009 | Fong |
| 7,714,619 B2 | 5/2010 | Yamada |
| 2003/0058013 A1 | 3/2003 | Cole |
| 2003/0146778 A1 | 8/2003 | McMahan et al. |
| 2006/0076984 A1 | 4/2006 | Lu et al. |
| 2006/0097756 A1 | 5/2006 | Minzoni |
| 2007/0075746 A1 | 4/2007 | Fruhauf et al. |
| 2007/0120584 A1 | 5/2007 | Carlile et al. |
| 2007/0236257 A1 | 10/2007 | Kejriwal |
| 2010/0164569 A1 | 7/2010 | Bode et al. |
| 2011/0317802 A1 | 12/2011 | Rohleder et al. |

FOREIGN PATENT DOCUMENTS

| | | |
|---|---|---|
| JP | 2008-103863 A | 5/2008 |
| KR | 10-2001-0059722 A | 7/2001 |
| KR | 10-2002-0053267 A | 7/2002 |
| KR | 10-2003-0050867 A | 6/2003 |

OTHER PUBLICATIONS

International Search Report and Written Opinion correlating to PCT/IB2009/051344 dated Dec. 31, 2009.

* cited by examiner

CLOCK GLITCH DETECTION

FIELD OF THE INVENTION

This invention relates to a circuit and to a method for detecting clock glitches.

BACKGROUND OF THE INVENTION

Schematically shown in FIG. 1 is a plot of an idealized clock signal 100. The clock signal 100 is presented, by way of example, as an electrical voltage V varying as a function of time t. More generally, the clock signal is the time-dependence of a physical quantity. For example, the clock signal could be provided optically by a variation of an intensity of light. The signal V(t) shown here is a regular succession of high and low values, $V_0$ and $V_1$, respectively. The low values last a time $T_0$, the high values last a time $T_1$. In the example shown, $T_0$ and $T_1$ are equal, but other ratios are also commonly used in the art. Transitions from the low value $V_0$ to the high value $V_1$ are referred to as a rising edges. In the example, rising edges occur at equidistant times $t_1$, $t_3$, and $t_5$. Transitions from the high value $V_1$ to the low value $V_0$ are termed falling edges. In the example, falling edges occur at equidistant times $t_0$, $t_2$, and $t_4$. Rising edges and falling edges are summarily referred to as clock edges.

A synchronous circuit generally relies on the presence of a clock signal similar to the one illustrated in the Figure. Operations to be performed by the components of the circuit are triggered by clock edges, for example, only by rising edges, or only by falling edges, or by both falling and rising edges. After an operation has been performed, the component waits for the next edge before executing the next operation. The various components can thus be synchronized. This is necessary because an operation to be executed by a component requires time during which the data put into the component must not change. Synchronization is used, for example, in state of the art systems to keep input values of components unchanged until the components have computed the corresponding output values. In the art, the term "synchronous circuit" is used for this. Any component thus controlled by the clock signal is said to be clocked by the clock signal. In this application, those edges which during standard operation trigger an operation of the synchronous circuit are referred to as triggering edges. In most synchronous circuits, the triggering edges are either rising edges or falling edges. However, in the case of a synchronous circuit operating at double data rate both rising and falling edges are triggering edges. More complicated schemes, in which only certain rising edges and/or only certain falling edges are triggering edges, may also be devised. Throughout this application, the time between two correctly timed consecutive triggering edges is referred to as the trigger period. In a double data rate scheme each clock period comprises two trigger periods. A synchronous circuit generally comprises flip-flops, or other digital components, which are interconnected by so called paths. The paths typically comprise signal lines and combinatorial logical components which implement an operation (function) to be performed within one or multiple trigger periods (multicycle paths),In a circuit containing multicycle paths, certain operations can last more than one cycle. The paths may have different lengths, corresponding to different propagation times. The longest single-cycle paths are typically referred to as critical paths. The critical paths define a shortest acceptable trigger period of the circuit.

A problem may arise if an edge in the clock signal is generated early, late, or unexpectedly. Less critical are cases where the interval between two subsequent triggering edges is longer than usual, for example, due to a stall of the device generating the clock signal. In contrast, functional errors may occur if either $T_0$ or $T_1$ (or both) are shorter than expected. These are typical examples of clock glitches. Clock glitches can be caused by, for example, crosstalk, electromagnetic interference, or particle impact. In the event of a clock glitch, components of the synchronous circuit may still be busy with an operation when receiving a triggering edge and therefore that triggering edge will either not trigger an action or trigger a faulty action. In FIG. 2, the time $T_0''$ is shorter than expected. In FIG. 3, the time $T_1'$ is shorter than expected. The dashed lines in FIG. 2 illustrate an example of an "insertion glitch", where an additional falling edge (at time $t_6''$) and an additional rising edge (at time $t_7''$) occur without affecting the clock signal at later times, i.e., without causing a phase shift in the clock signal.

In order to achieve a high ratio of detected faults versus occurring faults, safety related systems often employ redundancy, e.g. by replicating a part of their hardware and comparing the results of the copies. In order to save costs, newer approaches usually no longer replicate the hardware in several packages or dies but on a single chip. An example of this is the MPC564xL project, which replicates the CPU core, interrupt controller, bus, memory controllers, and some other components in two so-called lakes within its so-called sphere of replication (SoR). A problem with replication on a single chip is the existence of common cause failures (CCF) where one fault within the system can influence all replicas. This defeats the approach of replicated hardware. The copies behaving identically in the case of a CCF, such failures may in general not be detected by comparing the results of different replica. Glitches on the clock network are an example of such CCFs. One glitch, caused by e.g. electromagnetic interference or neutron impact, can propagate into both lakes and cause wrong results there due to violation of setup and/or hold times or by not allowing the logic function to be correctly completed before the next edge arrives.

Clock glitches are a prominent root cause for many functional errors of an electronic device. For safety related applications, detecting clock glitches is of special importance, since many CCFs are either generated by clock glitches or will also result in clock glitches. Detection allows taking measures to prevent further propagation of fault effects which could lead to more dangerous system failures.

SUMMARY OF THE INVENTION

The present invention provides a circuit and a method for detecting clock glitches as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the Figures are illustrated for simplicity and clarity and have not necessarily been drawn to scale. Analogous reference numerals in different Figures refer to identical or similar components.

DETAILED DESCRIPTION OF THE PREFERRED EMBODIMENTS

Figure 1:
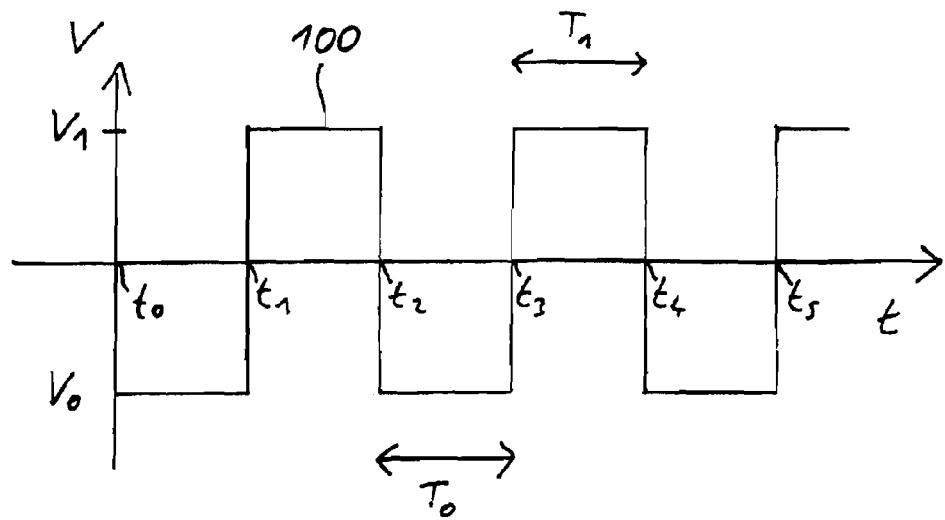
FIG. 1 shows a schematic diagram of an example of an ideal clock signal.
Figure 2:
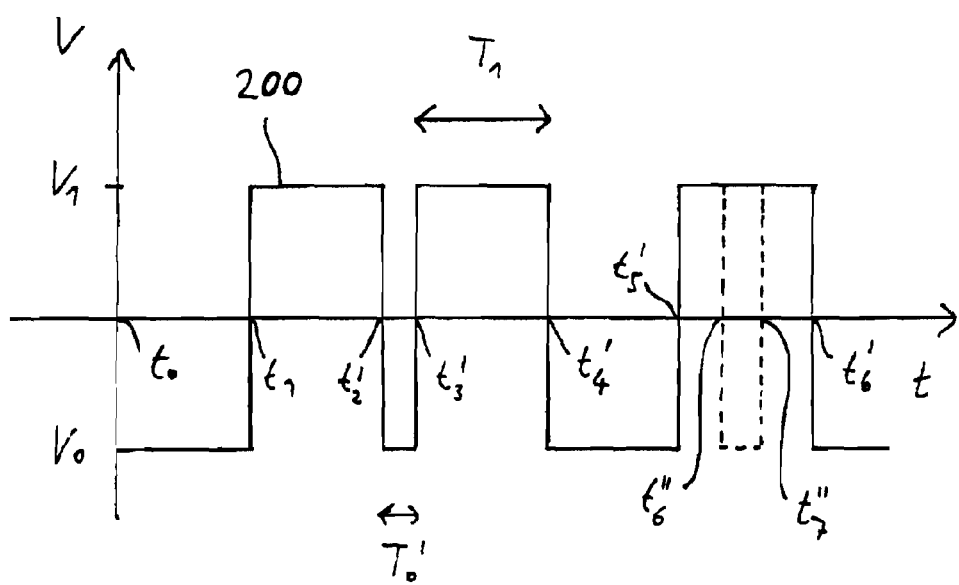
FIG. 2 shows a schematic diagram of an example of a clock signal showing two possible types of clock glitches.
Figure 3:
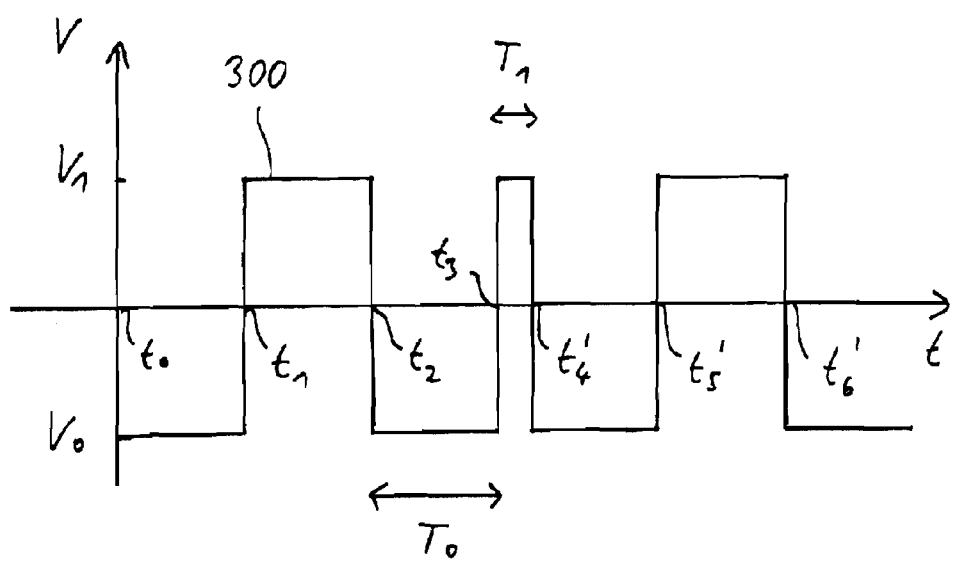
FIG. 3 shows a schematic diagram of an example of a clock signal having a clock glitch of the first type.
Figure 4:
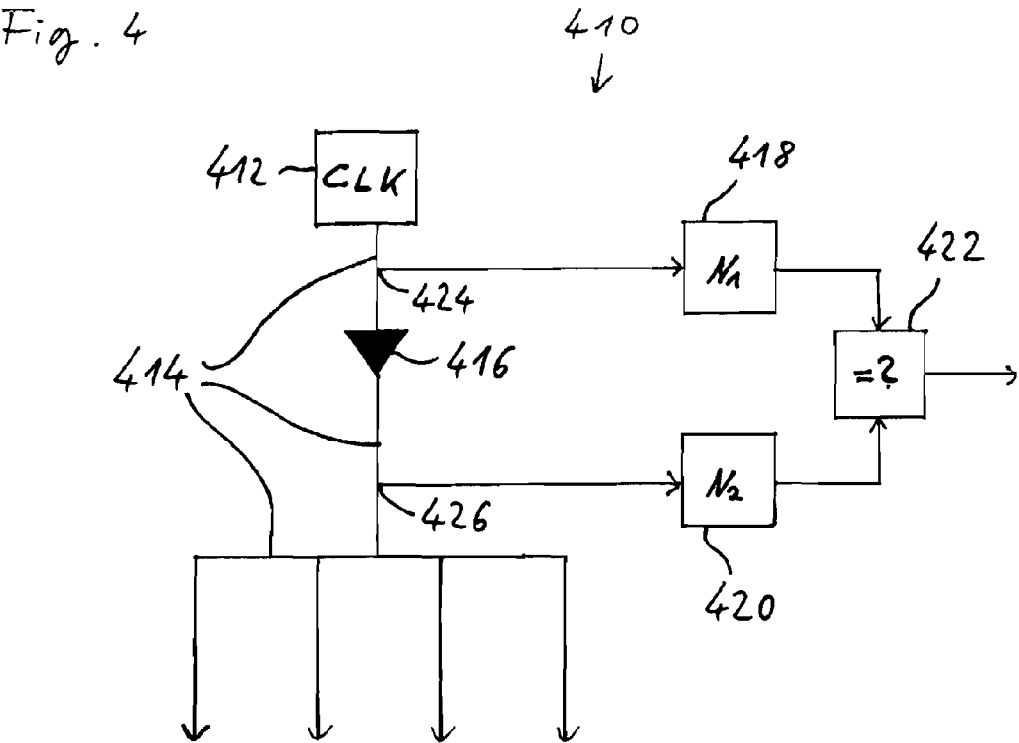
FIG. 4 schematically shows an example of an embodiment of a circuit for detecting clock glitches.

FIG. 4 shows, in a simplified manner, a circuit 410. The circuit 410 may be an integrated circuit. The circuit 410 comprises a clock 412 for generating a clock signal and a clock tree 414 for distributing the clock signal to a plurality of functional components (not shown) of the circuit 410. The clock signal may be similar to the clock signal 100 discussed above with reference to FIGS. 1, 2, and 3. The clock signal has a clock period but may exhibit clock glitches which violate the clock period. The clock tree 414 comprises a clock buffer 416 arranged after the clock 412. A first point 424 and a second point 426 of the clock tree 414 are situated before and after the buffer 416, respectively. Thus, in the embodiment shown here, the first point 424 and the second point 426 are not the same. Indeed they are separated by the clock buffer 416. They could be separated by other digital components (not shown). Thus the clock signal at the first point 424 is not necessarily exactly the same as the clock signal at the second point 426. A clock glitch, for example, an additional rising edge and an additional falling edge during a clock period, may be present, for example, at the first point 424 but be cancelled by the buffer 416 and therefore be absent in the clock signal at the second point 426. Conversely, a glitch might introduce itself into the clock signal at the second point 426 and be absent in the clock signal at the first point 424.

The circuit 410 further comprises a first counter 418 and a second counter 420. The first counter 418 is arranged at the first point 424 in the clock tree 414 and is capable of setting, upon detecting a triggering edge in the clock signal, a first current count equal to a first delayed count and of setting, after a first delay, the first delayed count equal to the first current count plus one increment. Similarly, the second counter 420 is arranged at the second point 426 in the clock tree 414 and is capable of setting, upon detecting a triggering edge in the clock signal, a second current count equal to a second delayed count and of setting, after a second delay, the second delayed count equal to the second current count plus one increment. The circuit 410 further comprises a comparator 422 for comparing the first current count and the second current count, e.g. by determining a difference between the first current count and the second current count.

The circuit 410 operates as follows. The clock 412 generates a clock signal. The first counter 418 and the second counter 420 receive the clock signal from the first point 424 and from the second point 426 of the clock tree 414, respectively. The first counter 418 and the second counter 420 memorize (i.e. store) the first current count (i.e. a digital number) and the second current count (i.e. another digital number), respectively. The first counter 418 and the second counter 420 operate similarly. Their operation will therefore be described only with reference to the first counter 418.

The first counter 418 (counter) continuously generates the first delayed count (delayed count) by adding an increment to the first current count (current count). The increment may be an integer number, for example, +1. The delayed count is retarded relative to the current count by the first delay (delay). That is, the delayed count at time $t+t_D$ is equal to the current count at time t, where t is an arbitrary point in time and $t_D$ is the delay. Thus, when the current count changes, the delayed count changes only after the delay. The delay is chosen shorter than the trigger period, i.e. shorter than the delay between consecutive triggering edges in the absence of clock glitches.

Normally, just before a triggering edge is detected, the delayed count equals the current count plus the increment. When the counter 418 subsequently detects the triggering edge, it sets the current count equal to the delayed count, effectively increasing the current count by one increment. After the delay, the delayed count increases accordingly by one increment. Thus, after the delay, a situation analogous to the initial normal situation has been regained, in which the delayed count equals the current count plus the increment. The counter 418 thus counts the triggering edges in the clock signal.

However, the counter may behave differently if a triggering edge arrives prematurely. As described above, when the counter detects a triggering edge, it sets the current count equal to the delayed count. The delayed count in contrast will increase only after the delay. Thus, after setting the current count equal to the delayed count, the delayed count and the current count remain equal during an interval corresponding to the delay. Now, if a triggering edge is detected during this interval, the current count is again set equal to the delayed count. However, the delayed count still being equal to the current count, this operation has no apparent effect. Indeed, the current count is simply reset to its current value. Thus, any triggering edge detected while the current count and the delayed count are equal will not change the current count.

Similarly, now considering the second counter 420, any triggering edge detected while the second current count and the second delayed count are equal will not modify the second current count. Hence the first counter 418 and the second counter 420 count a triggering edge if and only if the triggering edge is separated from the preceding triggering edge by a delay longer than the first delay and longer than the second delay, respectively. The comparator 422 compares the first current count and the second current count. Any change in the difference between the first current count and the second current count indicates that a clock glitch has occurred in the clock signal at the first point 424 or at the second point 426.

There are various options for defining the first delay and the second delay. The first delay and the second delay may be equal, or they may differ. In order to detect glitches at the second point 426 of the clock tree 414, the second delay may be chosen as short as possible, for example, less than 20%, less than 10%, less than 5%, less than 2%, or less than 1% of the trigger period. If the second delay is chosen negligibly short, the second counter will count virtually every triggering edge, including correctly timed triggering edges and triggering edges associated with clock glitches. Assuming that a premature triggering edge at the second point 426 will usually not be present in the clock signal at the first point 424, the premature triggering edge will cause the second current count to advance while the first current count remains unchanged. Thus the difference between the first current count and the second current count changes. An error signal is triggered accordingly. Both the first current count and the second current count may be reset to zero (or to any other number) after a clock glitch has been detected.

Similarly, in order to detect glitches in the clock signal at the first point 424 of the clock tree 414, the first delay may be chosen as short as possible, for example, less than 20%, less than 10%, less than 5%, less than 2%, or less than 1% of the trigger period.

In order to detect glitches introduced in the clock signal between the first point 424 and the second point 426, both the first delay and the second delay may be chosen as short as possible. Alternatively, the first delay and the second delay may be chosen different from each other. If delays are chosen carefully, this would allow detecting most of the clock glitches which are present both at the first point 424 and at the second point 426.

Figure 5:
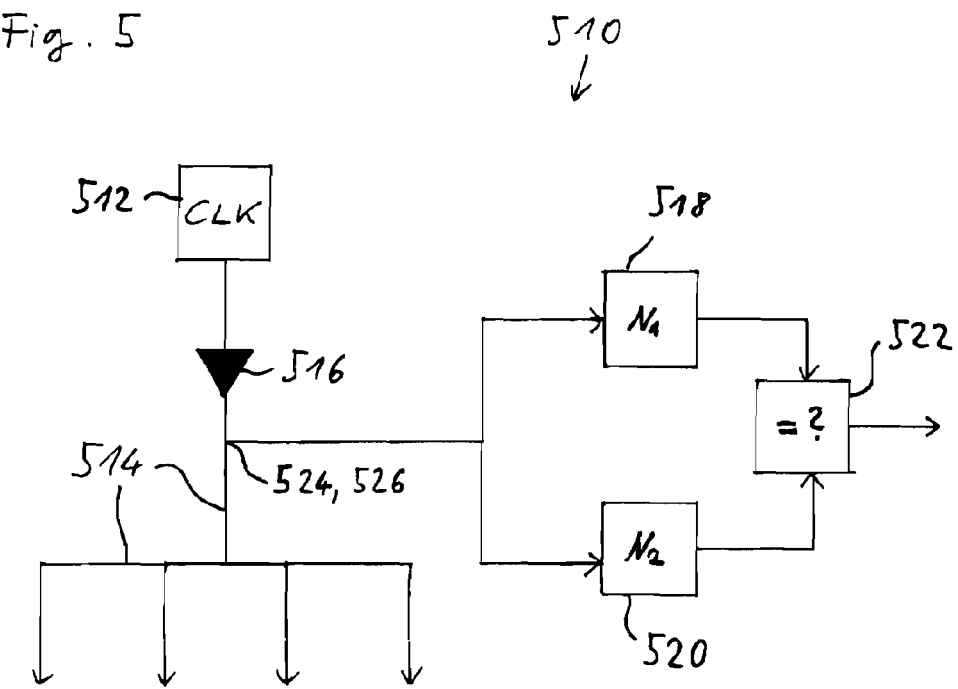
FIG. 5 schematically shows an example of another embodiment of a circuit for detecting clock glitches.

Referring now to FIG. 5, the circuit 510 shown therein comprises a first counter 518 and a second counter 520 which may be identical to the counters 418 and 420 described above with reference to FIG. 4. The circuit 510 differs from the circuit 410 chiefly in that the first counter 518 and the second counter 520 collect the clock signal from a common point 524, 526 in the clock tree. In other words, the first point 524 and the second point 526 are the same. Thus the first counter 518 and the second counter 520 receive the same clock signal. In order to detect premature triggering edges, the first delay is shorter than the second delay. For example, the first delay may be at most 20%, or at most 10%, or at most 5%, or at most 1%, of the second delay. According to a preferred embodiment, the first delay is as short as possible. As a consequence, a triggering edge that is separated from a previous triggering edge by a time longer than the first delay but shorter than the second delay will be counted by the first counter 518 but not by the second counter 520. The resulting difference between the first current count and the second current count is again detected by means of the comparator 522, and an error signal is generated accordingly. The second delay is chosen longer than the shortest acceptable trigger period of the circuit 510. Thus the first delay is chosen such that any glitch not triggering the first counter 518 will not trigger any incorrect action in the circuit 510 either whereas the second delay (more generally, the longer one of the first delay and the second delay) being longer than the shortest acceptable trigger period ensures that any triggering edge counted by the second counter (more generally, by the counter having the longer delay) is a triggering edge on which the circuit is expected to react properly. Hence neither of the two counters 518, 520 will count a glitch that has no influence and both counters 518, 520 will advance if the glitch is equivalent to a correct clock edge. The counters only behave differently for glitches which carry a danger of causing a wrong behavior in circuit 510. Thus the risk of generating false alerts is minimized.

Figure 6:
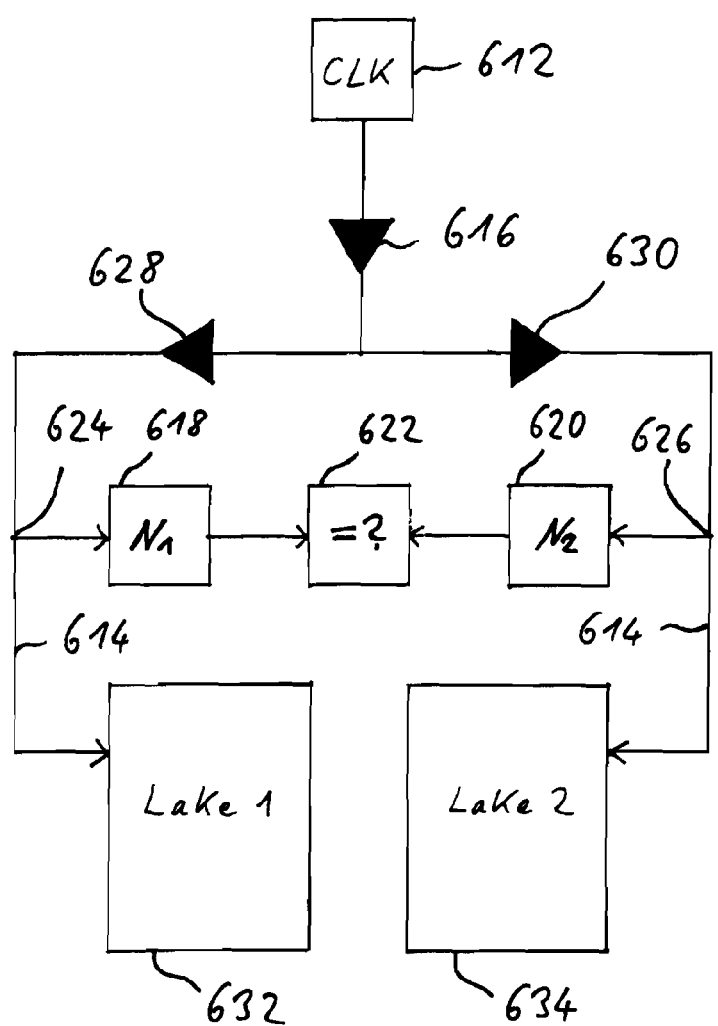
FIG. 6 schematically shows an example of yet another embodiment of a circuit for detecting clock glitches, the circuit comprising replicated hardware.

FIG. 6 shows an example of a circuit 610 comprising replicated hardware. The circuit 610 comprises a clock 612 for generating a clock signal, a clock tree 614, a first subcircuit 632 (Lake 1) and a second subcircuit 634 (Lake 2). The clock tree 614 comprises clock buffers 616, 628, 630. The first subcircuit 632 and the second circuit 634 are identical or similar in construction and receive the clock signal from a first point 624 and from a second point 626 of the clock tree 614, respectively. The first point 624 and the second point 626 are separated by the clock buffers 628 and 630. A clock glitch introduced in the clock signal before one of the clock buffers 628, 630, and 616 may reach both the first point 624 and the second point 626. In the event of such a glitch, both the first subcircuit 632 and the second subcircuit 634 may produce a wrong result. The first subcircuit 632 and the second subcircuit 634 being identical or similar, there is a non negligible chance of generating the same wrong result. Comparing the result produced by the first subcircuit 632 and the result produced by the second subcircuit 634 will in this case not indicate the occurrence of an error. However, early (premature) triggering edges in the clock signal may be detected by means of the first counter 618, the second counter 620, and the comparator 622, which operate as described above with reference to the corresponding elements in FIGS. 4 and 5. In the present embodiment, the first counter 618 has associated with it a very short first delay (shorter than the shortest acceptable trigger period), while the second counter 620 has associated with it a second delay which is longer than the shortest acceptable trigger period but shorter than the trigger period of the clock signal at points 624, 626. Thus the first counter 618 will count virtually all triggering edges, while the second counter 620 will count only those triggering edges which have a sufficient delay with respect to the preceding triggering edge. A difference between the first current count and the second current count again indicates that a clock glitch has occurred.

The proposed system may be capable of detecting most clock glitches. It may further be expected that many if not all of the undetected clock glitches are not dangerous as they occur either too shortly after the last intended clock edge to cause a state change in any flip-flop in the replicated logic or sufficiently late after the last intended clock edge so that each flip-flop in the replicated logic will respond correctly.

Figure 7:
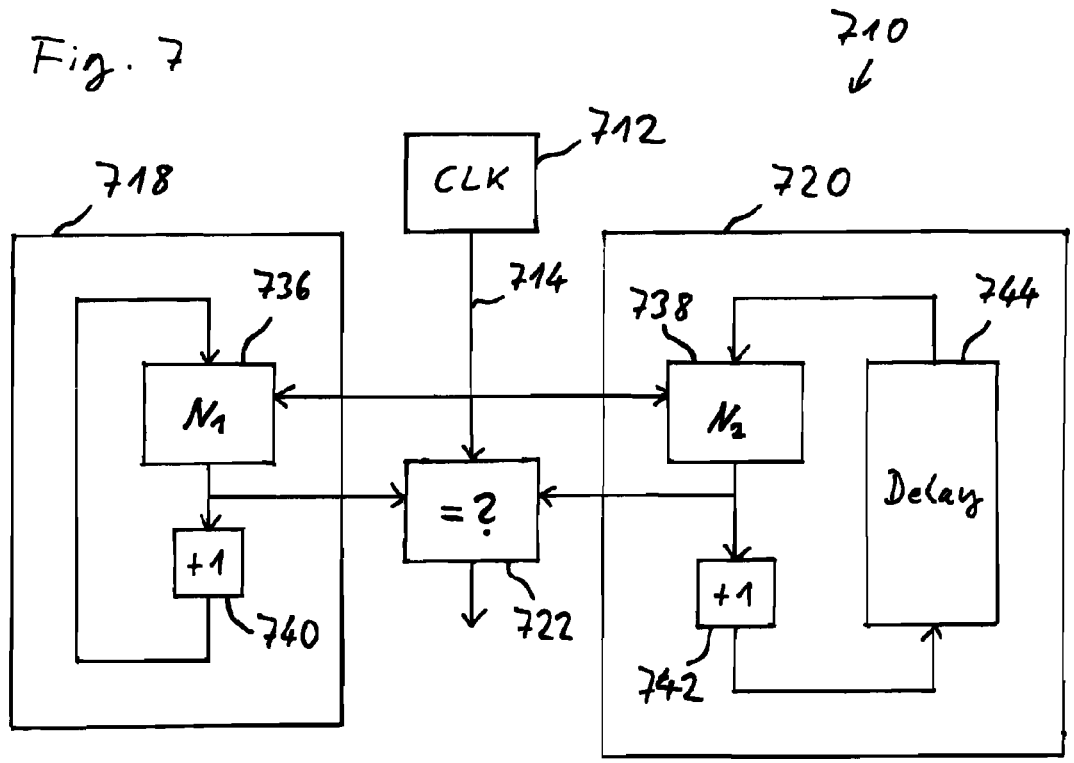
FIG. 7 schematically illustrates an example of an embodiment of a first counter and of a second counter as used in the circuits shown in FIGS. 4, 5 and 6.

Referring now to FIG. 7, there is illustrated, by way of example, a possible structure of a first counter 718 and of a second counter 720. The first counter 718 comprises a first register 736 and a first incrementor 740. An output of the first register 736 is coupled to an input of the first incrementor 740. An output of the first incrementor 740 is coupled to an input of the first register 736. The second counter 720 comprises a second register 738 and a second incrementor 742. An output of the second register 738 is coupled to an input of the second incrementor 742. An output of the second incrementor 742 is coupled to an input of the second register 738. In operation, the first current count and the first delayed count are defined at the output and at the input of the first register 736, respectively. Analogously, the second current count and the second delayed count are defined at the output and at the input of the second register 738, respectively. The first register 736 and the second register 738 may have the same bit size M, so that each of them is capable of storing an integer number between zero and $2^{M-1}$. For instance, M may be one, two, three, or four. The incrementors 740 and 742 may be integrated in the registers 736 and 738, respectively. According to a particular embodiment, the first register 736 is a first flip-flop and the second register 738 is a second flip-flop. It is noted that a flip-flop is a register having the bit size M=1, i.e. it is capable of storing one bit. In this case the incrementors 740 and 742 are reduced to negators (inverters) for converting logic one into logic zero, and vice versa. The negators may be integrated in the flip-flops. The second counter 720 comprises a delay line 744. The delay line 744 defines the second delay. In the example shown, the delay line 744 is coupled between the output of the second incrementor 742 and the input of the second register 738. Alternatively, the delay line 744 may be coupled between the output of the second register 738 and the input of the second incrementor 742. Furthermore there could be two delay lines, one coupled between the register 738 and the incrementor 742, and one coupled between the incrementor 742 and register 738. As indicated in the Figure, both the first register 736 and the second register 738 are clocked by a clock signal generated by a clock 712. When the first register 736 (the second register 738) detects a triggering edge, it sets the first current count (the second current count) equal to the first delayed count (the second delayed count) applied at its input. Due to the presence of the delay line 744, the second register 738 has at its input the current count until the current count plus one has been delivered via the delay line 744. Thus the second current count will not advance in the event of a triggering edge arriving during a time interval corresponding to the second delay. Because of the difference between the first delay and the second delay, the first delayed count and the second delayed count differ most of the time. During a single trigger period, they are identical only during a short time window [0, first delay] at the beginning of the trigger period and during another short time window [second delay, trigger period] at the end of the trigger period. These short time windows correspond to the intervals during which correct triggering edges are expected. Correct triggering edges lead to identical increments in the registers. Any triggering edge during [first delay, second delay] is an unexpected, glitch-caused edge and will cause a difference in the register values, thus indicating the glitch.

It is noted that the first counter 718 may also comprise a delay line, in a manner analogous to the second counter 720. This could be advantageous to avoid false alerts, for example, if all flip-flop connections within the functional circuit have a certain minimum logic length.

According to a first embodiment, the delay line 744 is provided by an inverter chain. Depending on the details on the circuit 710, the delay behavior of the chain and the functional critical paths (not shown) in the circuit 710 may be expected to react similarly to e.g. temperature and production variations. However, implementing the inverter chain may require a trimming or calibration step.

Figure 8:
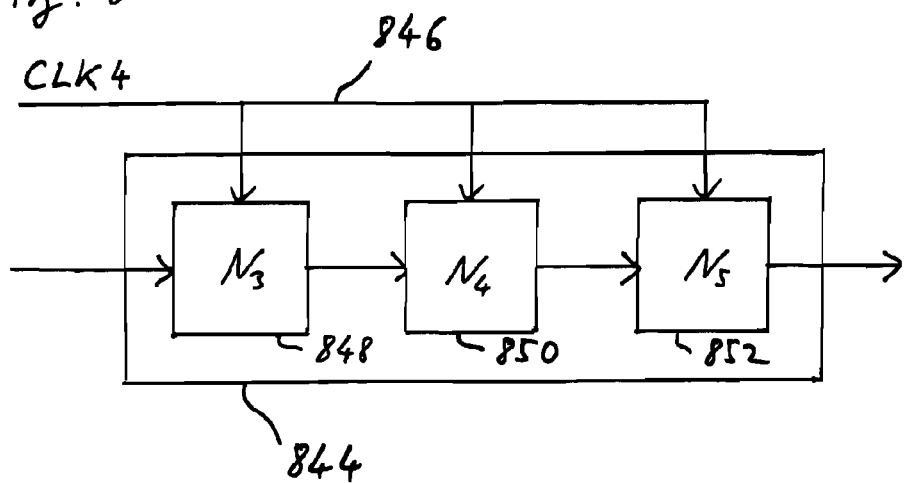
FIG. 8 schematically illustrates an example of an embodiment of a delay line used in the circuit shown in FIG. 7.

FIG. 8 represents another possible design of the delay line 744 discussed above with reference to FIG. 7. The delay line 844 has an input and an output, and is designed for transmitting a count from the input to the output. To this end, the delay line 844 comprises three registers 848, 850, 852 coupled in series. Each of the registers 848, 850, 852 may be identical in construction to one of the registers 736 and 738 described above. Each of the registers 848, 850, 852 has an input for receiving an input count and an output for delivering an output count. Upon detecting a triggering edge in a clock signal, each of the registers 848, 850, 852 will deliver at its output the input count it previously received at its input. The registers 848, 850, 852 are clocked by an auxiliary clock signal 846. The auxiliary clock signal 846 has a frequency which is higher than the frequency of the clock signal fed to the first register 736 and to the second register 738 shown in FIG. 7 (principal clock signal), to ensure that the delay line 844 has a delay which is shorter than the trigger period of the principal clock signal. More generally, the delay line 844 may comprise one register or at least two registers coupled in series. If the delay line 844 is composed of N registers coupled in series, it has a total delay of between N and N+1 times the trigger period of the auxiliary clock signal. The N registers are therefore clocked at a trigger frequency of at least N+1 times the trigger frequency at which the first register 736 and the second register 738 are clocked. For example, in the case of N=3 (as shown in the Figure), the registers in the delay line are operated at a frequency of at least four times the frequency of the principal clock signal. Both clock signals, i.e. the "slow" principal clock signal fed to the registers 736, 738 and the "fast" auxiliary clock signal fed to the delay line 744, may be generated from a common phase-locked loop (PLL). Thus it may be ensured that a phase shift of the operations in the delay line 844 with regard to the principal clock signal remains constant. This may allow implementing a delay line having a delay fixed at a specific value between N and N+1 times the period of the auxiliary clock signal. Otherwise, allowing the phase shift to vary, the delay of the delay line 844 may vary between N and N+1 times the trigger period of the auxiliary clock signal. For example, the auxiliary clock signal may be derived directly from a voltage-controlled oscillator (VCO). In any case the number N of registers may be chosen such that the delay of the delay line is shorter than the trigger period of the principal clock signal. Note that the delay achieved in this manner is nearly independent of temperature or production variations.

Figure 9:
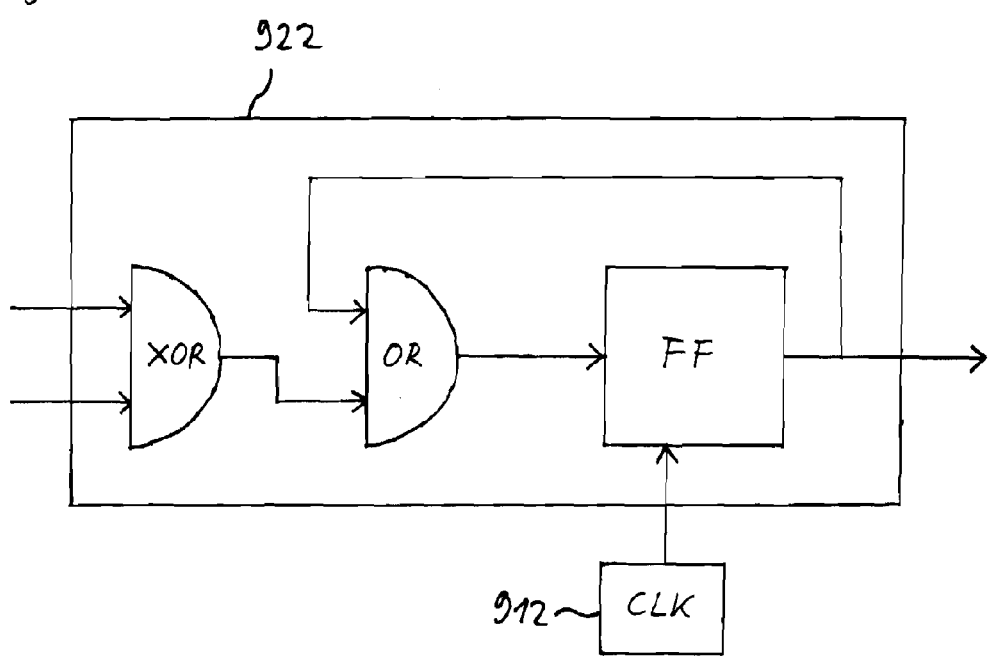
FIG. 9 schematically illustrates an example of an embodiment of a circuit for memorizing an error code.

Referring now to FIG. 9, there is illustrated, by way of example, a comparator 922 for being used in a circuit as described above with reference to FIGS. 4 to 7. The exemplary comparator 922 shown in the Figure is designed for the particular case in which both the first counter and the second counter only count from zero to one and then wrap around (i.e., they have a bit size M=1). Each of the first counter and the second counter delivers as output its respective current count, i.e. the first current count and the second current count, respectively. Each of the first current count and the second current count is either a logic zero or a logic one. The first current count and the second current count are input to an XOR gate. When the first current count and the second current count differ, the XOR gate outputs a one, thus indicating a clock glitch. Otherwise the XOR gate outputs a zero. The output of the XOR gate is saved into a flip-flop (FF) clocked by the same clock signal that also clocks the first counter and the second counter. Noting that a second clock glitch may cause the first current count and the second current count to be identical again, it may be advantageous to protect a logic one stored in the flip-flop from being removed by the effect of the second clock glitch. To this end, the comparator 922 comprises an OR gate coupled between the XOR gate and the flip-flop. The output of the XOR gate and the output of the flip-flop are input to the OR gate. The output of the OR gate is input to the flip-flop. At each triggering glitch, the flip-flop is thus set to a one if the XOR gate outputs a one (i.e. when a new clock glitch has been detected) or when the flip-flop outputs a one (i.e. when a clock glitch has been detected previously). The flip-flop may be reset to the logic zero state by means of circuitry not shown in the Figure. A preferred implementation of this would contain a clocked latch having a zeroed R input instead of the flip-flop and the OR gate.

Figure 10:
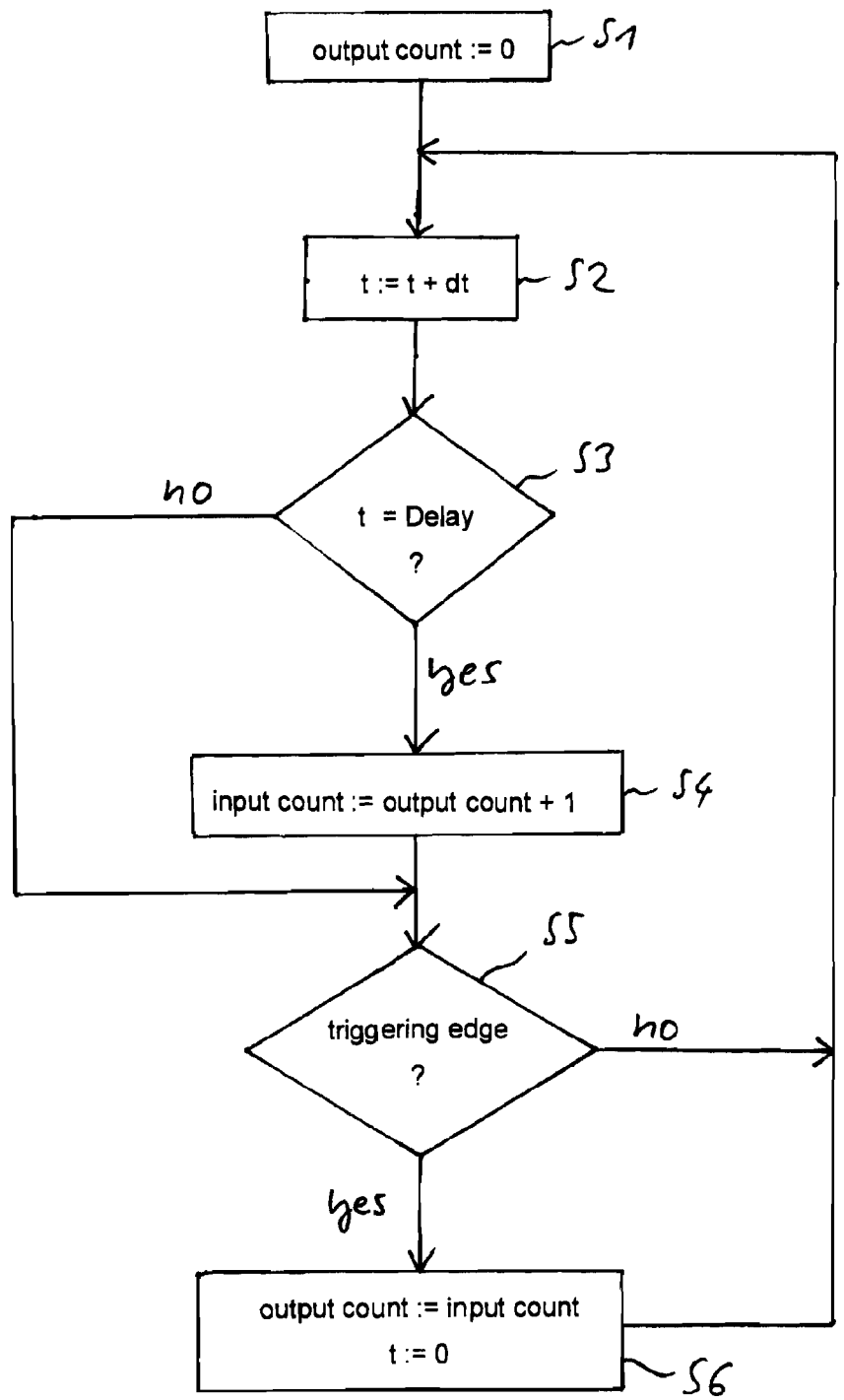
FIG. 10 is a flow chart illustrating operation of an example of a counter.

FIG. 10 is a flow-chart illustrating the behavior of a counter representative of the first counter and of the second counter described above with reference to FIGS. 4 to 7. The circuit thus has associated with it a delayed count, a current count, and a delay $t_D$. In a preliminary step S1, the current count is set to zero (i.e. to logic zero), and the time t is taken to be zero. Subsequent step S2 merely represents an increase dt in time t due to the natural flow of time. If the time t is equal to the delay $t_D$, (step S3), the delayed count becomes equal to the current count plus one increment (step S4). Otherwise the step S4 is bypassed. Subsequently, if a triggering edge is detected (step S5), the current count is set equal to the delayed count and the time t is again taken to be zero (step S6). Otherwise the process returns to step S2. From step S6 the process also returns to step S2. It is recognized that the current count increases in step S6 if and only if a triggering edge is detected in step S5 at a time t larger than the delay $t_D$.

The process explained above with reference to FIG. 10 may be part of a method for detecting clock glitches in a clock signal distributed over a clock tree, the clock tree comprising a first point and a second point. The method comprises the steps of:

setting, upon detecting a triggering edge in the clock signal at the first point, a first current count equal to a first delayed count;

setting, after a first delay, the first delayed count equal to the first current count plus one increment;

setting, upon detecting a triggering edge in the clock signal at the second point, a second current count equal to a second delayed count;

setting, after a second delay, the second delayed count equal to the second current count plus one increment; and comparing the first current count and the second current count;

wherein the first point and the second point are not the same or wherein the second delay is longer than the first delay. The method may be implemented, for example, by means of circuitry described above with reference to FIGS. 4 to 10.

It is further emphasized that the invention can also be implemented using optical signal processing. In particular, it can be applied to a redundant fibre optical network. The above mentioned delays can be achieved by means of optical delay elements.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals. In particular, the terms "rising edge" and "falling edge" are interchangeable.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Also for example, in one embodiment, the illustrated elements of system 710 are circuitry located on a single integrated circuit or within a same device. Alternatively, system 710 may include any number of separate integrated circuits or separate devices interconnected with each other. For example, register 736 may be located on a same integrated circuit as register 738 on a separate integrated circuit or located within another peripheral or slave discretely separate from other elements of system 710. Also for example, system 710 or portions thereof may be soft or code representations of physical circuitry or of logic representations convertible into physical circuitry. As such, system 710 may be embodied in a hardware description language of any appropriate type.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, registers 736 and 738 may be connected to physically separated branches of the clock tree, the clock signal being distributed by a telecommunication modality rather than by a wire. Also, devices functionally forming separate devices may be integrated in a single physical device. For example, the register 736 and the incrementor 740 may form a single device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. An element referred to in the claims as the first element may correspond to an element referred to in the description as the second element, and vice versa.

The mere fact that certain measures are recited in mutually different claims does not indicate that a combination of these measures cannot be used to advantage.

The invention claimed is:

1. A circuit comprising
a clock tree for distributing a clock signal;
a first counter arranged at a first point in the clock tree and capable of setting, upon detecting a triggering edge in the clock signal, a first current count equal to a first delayed count and of setting, after a first delay, the first delayed count equal to the first current count plus an increment;
a second counter, arranged at a second point in the clock tree and capable of setting, upon detecting a triggering edge in the clock signal, a second current count equal to a second delayed count and of setting, after a second delay, the second delayed count equal to the second current count plus the increment; and
a comparator for comparing the first current count and the second current count;
wherein the first point and the second point are not the same or wherein the second delay is longer than the first delay.

2. The circuit as set forth in claim 1, wherein the first counter comprises a first register and a first incrementor an output of the first register being coupled to an input of the first incrementor, and an output of the first incrementor being coupled to an input of the first register, and wherein the second counter comprises a second register and a second incrementor, an output of the second register being coupled to an input of the second incrementor and an output of the second incrementor being coupled to an input of the second register.

3. The circuit as set forth in claim 2, wherein the first register and the second register have the same bit size.

4. The circuit as set forth in claim 2, wherein the first register is a first flip-flop and the second register is a second flip-flop.

5. The circuit as set forth in claim 2, wherein the second counter comprises a delay line, the delay line being coupled between the output of the second register and the input of the second incrementor, or between the output of the second incrementor and the input of the second register.

6. The circuit as set forth in claim 5, wherein the delay line comprises one register or at least two registers coupled in series.

7. The circuit as set forth in claim 5, wherein the first counter comprises a delay line, the delay line being coupled between the output of the first register and the input of the first incrementor, or between the output of the first incrementor and the input of the first register.

8. The circuit as set forth in claim 1, wherein the second delay is longer than a shortest acceptable trigger period.

9. The circuit as set forth in claim 1, wherein the first delay is at most 10% of the second delay.

10. The circuit as set forth in claim 1, comprising a clock for generating the clock signal.

11. The circuit as set forth in claim 10, wherein the second delay is shorter than the normal trigger period.

12. The circuit as set forth in claim 1, wherein the first delay and the second delay are equal.

13. The circuit as set forth in claim 1, comprising a first subcircuit and a second subcircuit, the first subcircuit and the second circuit being identical in construction and receiving the clock signal from the first point and from the second point respectively.

14. A method for detecting clock glitches in a clock signal distributed over a clock tree, the clock tree comprising a first point and a second point, the method comprising the steps of:
setting, at a first counter, upon detecting a triggering edge in the clock signal at the first point, a first current count equal to a first delayed count;
setting, after a first delay, the first delayed count equal to the first current count plus one increment;
setting, at a second counter, upon detecting a triggering edge in the clock signal at the second point, a second current count equal to a second delayed count;
setting, after a second delay, the second delayed count equal to the second current count plus one increment; and
comparing the first current count and the second current count;
wherein the first point and the second point are not the same or wherein the second delay is longer than the first delay.

15. The method of claim 14, wherein the second delay is longer than a shortest acceptable trigger period.

16. The method of claim 14, wherein the second delay is shorter than the normal trigger period.

17. The method of claim 14, wherein the first delay and the second delay are equal.

18. A method comprising:
providing a clock signal over a clock tree, the clock tree comprising a first point and a second point;
setting, at a first counter, a first current count equal to a first delayed count in response to detecting a triggering edge in the clock signal at the first point;
setting, after a first delay, the first delayed count equal to the first current count plus one increment;
setting, at a second counter, a second current count equal to a second delayed count in response to detecting a triggering edge in the clock signal at the second point;
setting, after a second delay, the second delayed count equal to the second current count plus one increment, wherein the first point and the second point are not the same or wherein the second delay is longer than the first delay;
comparing the first current count and the second current count; and
determining that a clock glitch is present in the clock signal in response to the first current count not equaling the second current count.

19. The method of claim 18, wherein the second delay is longer than a shortest acceptable trigger period.

20. The method of claim 18, wherein the second delay is shorter than the normal trigger period.

* * * * *